United States Patent [19]

Soloveychik et al.

[11] Patent Number: 4,928,170

[45] Date of Patent: May 22, 1990

[54] AUTOMATIC FOCUS CONTROL FOR AN IMAGE MAGNIFICATION SYSTEM

[75] Inventors: Yakov G. Soloveychik, Encino; Larry Israel, Santa Monica, both of Calif.

[73] Assignee: Visualtek, Inc., Santa Monica, Calif.

[21] Appl. No.: 209,704

[22] Filed: Jun. 21, 1988

[51] Int. Cl.⁵ .............................................. H04N 7/18
[52] U.S. Cl. ...................................... 358/94; 358/227; 358/93
[58] Field of Search ................... 358/94, 227, 93, 229, 358/225, 100, 254; 354/409, 195.13

[56] References Cited

U.S. PATENT DOCUMENTS

| | | | |
|---|---|---|---|
| 3,816,646 | 6/1974 | Cinque | 358/94 X |
| 4,115,813 | 9/1978 | Mikámi | 358/94 X |
| 4,584,204 | 4/1986 | Ferren | 358/22 X |
| 4,616,264 | 10/1986 | Pshtissky | 358/227 |
| 4,717,959 | 1/1989 | Isago | 358/227 |
| 4,789,898 | 12/1988 | Zwinn et al. | 358/227 |
| 4,841,370 | 6/1989 | Murashima et al. | 358/227 |

Primary Examiner—James J. Groody
Assistant Examiner—Victor R. Kostak
Attorney, Agent, or Firm—Kelly, Bauersfeld & Lowry

[57] ABSTRACT

An automatic focus control system and related method of operation are provided for use in a closed circuit television system of the type designed for magnification of written images and the like, thereby permitting facilitated reading or viewing by persons with restricted vision. The focus control system responds to selected characteristics of a video signal to adjust the focus setting of a signal-producing video camera for substantially optimum image focus resolution. The focus control system operates initially in a scan mode to rapidly adjust the camera focus setting until the selected signal characteristics exceed a predetermined threshold, whereupon the system switches to a fine adjustment mode utilizing a sampling algorithm to achieve a substantially optimum focus setting.

13 Claims, 2 Drawing Sheets

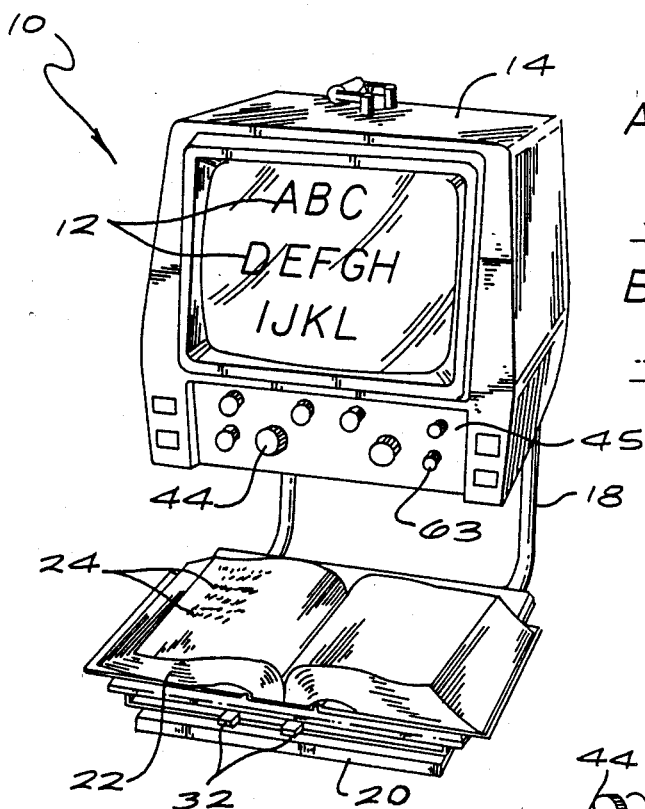
FIG. 1
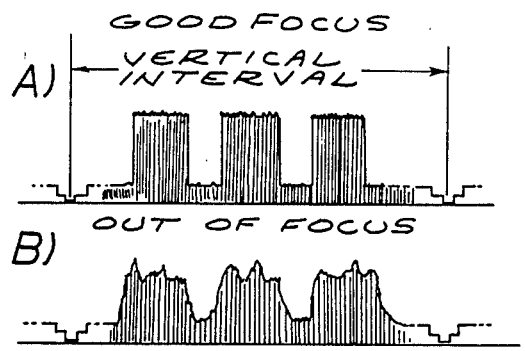
FIG. 3
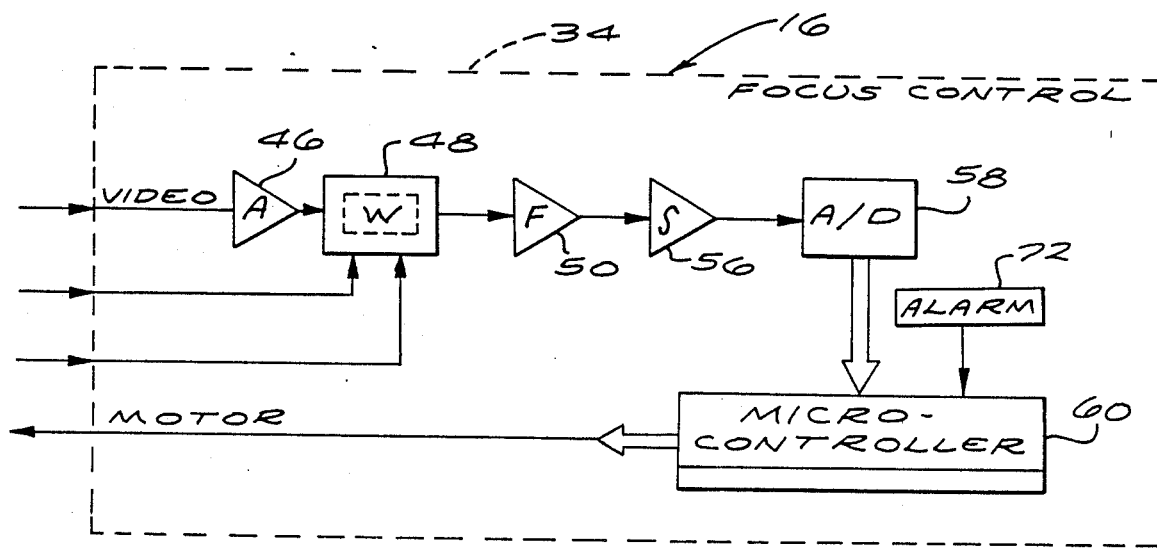
FIG. 2
FIG. 4

AUTOMATIC FOCUS CONTROL FOR AN IMAGE MAGNIFICATION SYSTEM

BACKGROUND OF THE INVENTION

This invention relates generally to improvements in closed circuit television systems of the type designed for magnifying or enlarging images such as written text and the like for reading or viewing by persons afflicted with vision impairment. More specifically, this invention relates to such television systems having improved and relatively economical means for rapidly and automatically adjusting image focus to a substantially optimized image quality or resolution.

Closed circuit television systems are generally well known in the art to include a video monitor for displaying images generated electronically by an associated video camera. The video camera includes means for generating a video signal comprising an electronic representation of the desired image or images, and this video signal is coupled to the monitor for appropriate demodulation and display. An adjustable lens on the camera is provided to alter the camera focus setting according to the image range such that the image is displayed on the monitor in relatively sharp focus.

While closed circuit television systems have been used in many different environments, one important system application comprises magnification or enlargement of images such as written text and the like to permit reading and viewing by persons with restricted vision. More specifically, a significant number of individuals are afflicted with impaired vision capacity attributable to a variety of causes, wherein such individuals are generally unable to read or write in a normal manner utilizing written images of a standard size. However, many of these individuals possess sufficient vision capacity to read and/or view such images in an enlarged state. To this end, closed circuit television systems have been developed to include a video camera with a relatively short focal length lens for producing electronic signals representing written material and the like for display in enlarged form on the screen of a video monitor. Such systems commonly include a relatively compact support frame for the camera and monitor, together with a support platen for receiving the written material or the like to be viewed. A rotatable focus control knob is normally provided for adjusting the camera lens to obtain relatively sharply focused images displayed by the monitor. Exemplary of such television systems for use by partially sighted persons are the systems marketed by VTEK of Santa Monica, Calif., under the name Voyager.

Although closed circuit television systems with image magnification constitute a valuable tool for persons with impaired vision, focus adjustment of such systems can be difficult or even impossible. That is, many individuals have inadequate visual acuity to discern easily between good and poor focus settings. Moreover, some individuals have insufficient manual dexterity for adjusting a manual focus control mechanism. Accordingly, focus adjustment can be a particularly difficult and frustrating task, with a poor focus setting typically reducing further the viewer's ability to read and write in a normal manner. Alternately, to obtain a satisfactory focus setting, assistance from a person having normal vision capacity is often required.

Automated focus setting arrangements have been proposed in the prior art for use with various types of camera equipment. Such automated arrangements have typically required the camera to transmit a signal, such as an infrared or sonic signal or the like, for reflection from the image back to the camera, with the camera including appropriate detector means for sensing the reflected signal and responding thereto to adjust a camera lens to a desired setting. However, such automatic focus arrangements have generally required a minimum focus setting length of at least a few feet to obtain satisfactory operation in a relatively economical system. Conversely, such arrangements have not been practical for use in short range focus systems, such as a closed circuit television system for partially sighted persons wherein the focus range of such systems is typically on the order of about one foot and less.

There exists, therefore, a significant need for improvements in closed circuit television systems for use by persons with impaired vision, particularly with respect to providing relatively economical yet accurate automatic focus control. The present invention fulfills these needs and provides further related advantages.

SUMMARY OF THE INVENTION

In accordance with the invention, an automatic focus control system and related method of operation are provided for use in a closed circuit television of the type designed for magnifying written images and the like. The automatic focus control system comprises a focus control circuit for rapidly analyzing selected characteristics of a generated video signal representative of the image or images to be viewed. The control circuit is programmed to identify and respond to the selected video signal characteristics to adjust the lens of a video camera in a manner achieving substantially optimized image resolution.

In the preferred form of the invention, the automatic focus control system is integrated directly into a closed circuit television system having a relatively compact frame supporting a video camera and an associated video monitor. The camera is supported above and trained upon a support platen adapted to receive an image or images to be observed. The video camera produces a standard video signal comprising an electronic representation of the image. The video signal is coupled to the monitor for demodulation and display. A camera lens provides significant image enlargement and is adjustable to alter the camera focus setting to achieve high quality image resolution.

The focus control circuit is activated by a pushbutton or the like to function initially in a scan mode. In the scan mode, the camera lens is positionally adjusted rapidly by a motor means such as a stepper motor or the like while the video signal is analyzed for selected characteristics indicative of relatively high quality image focus. In the preferred form, the video signal is monitored to detect the presence of relatively high frequency signal portions in excess of a selected threshold. When the threshold is exceeded, the focus control circuit switches to a fine adjustment mode during which the video signal is sampled over a selected narrow range of lens adjustment positions to achieve a substantially optimum focus setting.

In the preferred form of the invention, the control circuit is programmed to apply a sampling algorithm during the fine adjustment mode to achieve a rapid and relatively accurate focus setting operation. More particularly, the circuit samples the video signal at rapid intervals while the lens is adjusted rapidly in incremental steps through a predetermined range or number of lens adjustment positions. The circuit calculates the differences between adjacent signal samples and sums the resultant differences over the predetermined range or number of lens adjustment positions until the summation thereof substantially equals zero. When this occurs, the lens is adjusted by the motor substantially to a midpoint of said predetermined range. In this midpoint position, the image focus is substantially optimized.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a closed circuit television system of the type designed to enlarge and display written images and the like;

FIG. 2 is a schematic diagram depicting the closed circuit television system of FIG. 1 and including a video camera with adjustable lens in combination with the automatic focus control system embodying the novel features of the invention;

FIG. 3 is a graphic representation illustrating general characteristics of typical video signals representative of respectively good and poor focus settings;

FIG. 4 is a schematic circuit diagram illustrating the general functional operation of the automatic focus control system;

DETAILED DESCRIPTION OF THE PREFERRED EMBODIMENT

Figure 5:
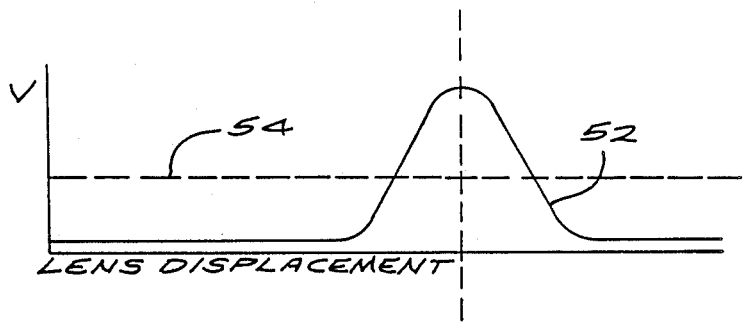
FIG. 5 is a graphic representation showing selected portions of a generated video signal as a function of video camera lens adjustment.

As shown in the exemplary drawings, an improved closed circuit television system referred to generally by the reference numeral 10 in FIG. 1 is provided for displaying written images 12 and the like in enlarged form on the viewing screen of a video monitor 14. The improved television system 10 includes an automatic focus means 16 (FIG. 2) for rapidly and automatically focusing the displayed images 12 for easy viewing.

The improved closed circuit television system 10 including the automatic focus control means 16 is designed particularly for use by persons with impaired or restricted vision to permit such persons to read, write and/or view images which would otherwise be difficult or impossible to see. The invention advantageously provides a relatively simple and economical apparatus and method for ensuring sharp image resolution without requiring viewer intervention. Accordingly, images can be displayed and deciphered quickly and easily without the need for manual focus adjustments, wherein such manual focus adjustments can be difficult and/or frustrating to persons with limited vision capacity.

The overall construction and operation of the television system 10 is generally known in the art. More particularly, with reference to FIGS. 1 and 2, the television system 10 comprises a relatively compact support frame 18 sized typically for tabletop or desktop use. The support frame 18 includes a lower platen 20 defining a relatively flat support surface for a book 22 or other object having images 24 such as written text to be viewed. The platen 20 is disposed in spaced relation below a video camera 26 (FIG. 2) supported by the frame 18 in a position nested beneath the video monitor 14. The video camera 26 functions in a normal manner to record the images 24, typically through the use of a reflecting mirror 28, and to generate an appropriate video signal which is coupled to the monitor 14 for displaying the images on the monitor screen. A focusing lens 30 for the video camera 26 provides a selected degree of image magnification, typically in the range of about $25 \times -60 \times$, and is adjustable to accommodate a range of focus settings in accordance with the varying thicknesses of objects placed onto the platen 20 for viewing. In closed circuit television systems of this general type, the maximum focus range to the image is on the order of about one foot or less. Manual control members 32 on the platen 20 may be provided to shift the platen laterally or transversely relative to a camera sight line to permit selected images on a page or the like to be viewed.

Figure 8:
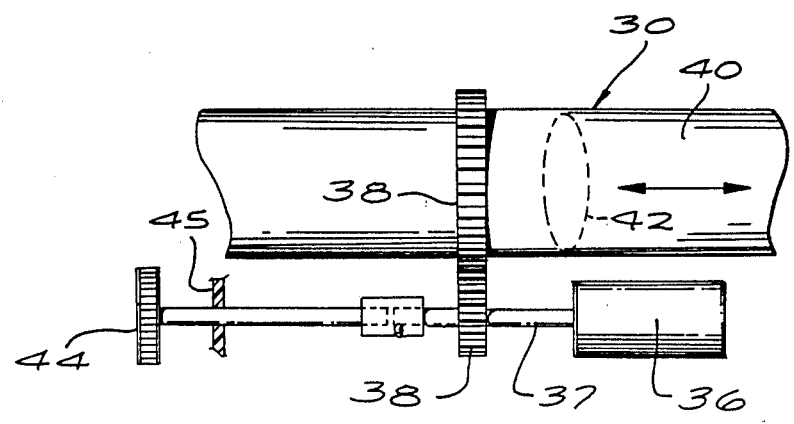
FIG. 8 is a somewhat schematic fragmented sectional view illustrating mechanical connection of the camera lens to a lens adjustment motor and further to a manually operated adjustment knob.

In accordance with the invention, the automatic focus control means 16 responds to selected characteristics of the generated video signal to adjust the focusing lens 30 to a substantially optimized focus setting. As shown schematically in FIGS. 2 and 4, the focus control means comprises a control circuit 34 coupled electrically to the video signal for monitoring and processing the signal, as will be described. The control circuit 34 reacts to the video signal to operate a lens adjustment motor 36 which is coupled in turn to the focusing lens 30 for positional adjustment purposes. Although the particular type of motor 36 and the nature of its connection to the lens may vary, a bidirectional stepper motor is preferred and will typically have a rotatably driven output shaft 37 linked via gear members 38 (FIG. 8) to a lens tube 40 and adapted for axially shifting one or more lens members 42 to adjust focus setting in a manner known to those skilled in the art. Optionally, the motor output shaft 37 may additionally be linked to a manual control knob 44 (FIG. 8) located on a system control panel 45 (FIG. 1), if alternative manual focus adjustment capability is desired.

FIG. 3 shows graphic representations of video signals corresponding respectively with relatively well focused and relatively poorly focused images. As shown, the video signal comprises a complex combination of horizontal and vertical signal components supplied to the monitor 14 for conventional demodulation and display. When the displayed image is relatively sharply focused, the video signal includes a sequence of signal peaks defined by relatively sharp leading and trailing edges, as depicted in FIG. 3A. These signal peaks tend to include regular patterns of high frequency components indicative of regions on the screen of sharp contrast, namely, images edges of relatively well focused quality. By contrast, a signal representative of a poorly focused image is depicted in FIG. 3B and is characterized by poorly defined leading and trailing edges and a reduced level of high frequency components therebetween. The automatic focus control circuit 34 of the present invention monitors the video signals and adjusts the focusing lens 30 until a signal pattern representative of a well focused image, as depicted in FIG. 3A, is detected.

The control circuit 34 is shown in one preferred from in FIG. 4. As shown, the video signal from the camera 26 is supplied to an initial amplifier 46 for signal amplification, and then to an electronic window switch 48. As depicted schematically in FIG. 4, the window switch 48 functions to isolate upon those limited portions of the video signal corresponding with a limited central region of the image when displayed on the monitor screen. In this manner, other portions of the video signal corresponding with peripheral or corner regions of the screen are disregarded, since those screen regions are generally associated with higher levels of signal noise and/or image distortion. Conveniently, the general construction of the window switch 48 is relatively standard and well known in the art, and thus is not described in further detail herein.

The portion of the video signal targeted by the window switch 48 is coupled to a high pass filter 50. This filter 50 passes selected high frequency portions of the video signal typically in the range of 8-10 megahertz, wherein such high frequency portions are associated with relatively high quality image focus. This variable proportion of high frequency portions is represented graphically in FIG. 5 in relation to focusing lens adjustment by the curve 52, which can be characterized as a focus signal. Portions of the curve 52 falling below a selected threshold 54 represent lens positions of poor focus quality for the image. Conversely, portions of the curve 52 above the threshold 54 represent lens positions with relatively good image quality. As shown in FIG. 5, the portions of the curve 52 which exceed the threshold exhibit a generally bell curve geometry.

The output of the high pass filter 50 is integrated by an integrator 56 (FIG. 4) and then coupled to an analog-to-digital converter 58 which provides a digitalized signal representing the curve 52 (FIG. 5) to a microcontroller 60. This microcontroller 60 is programmed to provide appropriate output signals to the motor 36 and its associated motor drivers (not shown) to adjust the position of the focusing lens 30 in response to the digitalized input.

Figure 6:
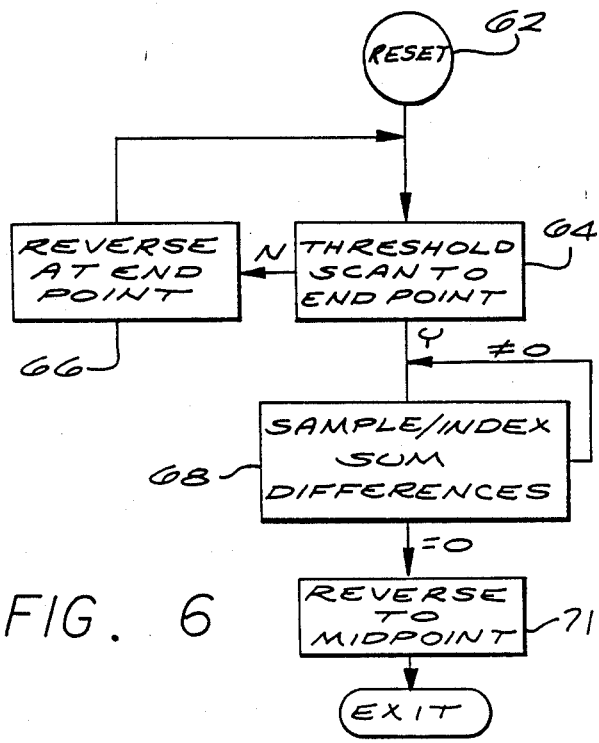
FIG. 6 is a flow chart showing the analytical steps performed by the automatic focus control system.

More specifically, as shown in the flow chart of FIG. 6, the microcontroller 60 responds to a reset command 62 to initiate the automatic focus procedure. This reset command is conveniently inputted to the microcontroller 60, for example, by a pushbutton 63 (FIG. 1) or the like on the system control panel each time focus readjustment is desired, such as when a new image is placed onto the platen 20 for viewing. When the reset command 62 is given, the microcontroller 60 enters a scan mode 64 (FIG. 6) wherein the motor 36 is powered to displace the focusing lens 30 relatively rapidly in one adjustment direction. Such lens displacement may occur continuously or in rapid steps by appropriate motor operation. In either case, the microcontroller 60 analyzes the digital input from the converter 58 with a rapid sampling rate, such as about 60 cycles per second. Throughout this scan mode, the microcontroller searches for the presence of high frequency components exceeding a predetermined threshold as represented by the curve 54 (FIG. 5), wherein such detection represents the edge of a range of lens adjustment positions corresponding with improved image quality. In the event the focusing lens 30 is adjusted to one end of its normal adjustment range without detecting high frequency components in excess of the threshold, the microcontroller 60 automatically enters a reverse command 66 to initiate motor displacement in an opposite direction. In this regard, in television systems of this general type, a typical range of lens adjustment is on the order of about 400° rotation.

Figure 7:
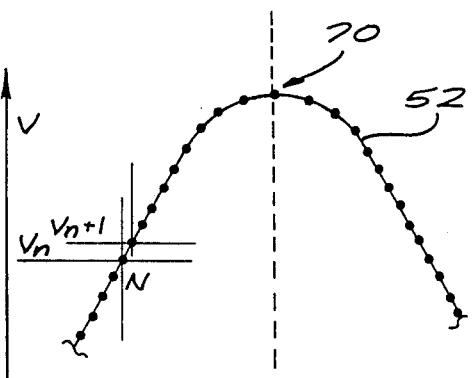
FIG. 7 is a graphic depiction of the sample/index step shown in the flow chart of FIG. 6.

When the high frequency components are detected to exceed the threshold, the microcontroller 60 switches to a fine adjustment mode for fine tuning of the focusing lens position. In this mode, the motor 36 is rapidly operated in incremental steps and the digital input is sampled at each step, as represented by the sample/index block 68 in FIG. 6. For each adjacent pair of steps, the difference between the sampled inputs is calculated, and the difference value is stored in an appropriate memory. For example, in a preferred system arrangement, the motor is stepped at increments of about 0.5°-1.0° lens rotation at a sampling rate of about 60 cycles per second, and the difference values $(V_n+1) V_n$ as shown in FIG. 7 are calculated for each adjacent pair of steps. These difference values will in general be represented by initially positive values indicating an upslope region of the curve 52 as the focusing lens approaches an optimum focus position of the curve peak, as indicated by arrow 70 in FIG. 7. However, the difference values will switch to negative values indicating a downslope region of the curve 52 as the lens is adjusted beyond the optimum focus position 70.

The microcontroller 60 is programmed to continue the sample/index calculation procedure for a predetermined minimum selected number of sample steps, and until the sum total stored in the memory substantially equals zero. When the number of sample steps is reached but the memory sum is not equal to zero, the microcontroller 60 continues the sampling procedure by replacing the oldest difference value in memory with the newest calculated difference value until a stored sum of substantially zero is obtained. In this manner, the number of calculated difference values in memory is limited to a predetermined selected number of samples. The selected sample number is chosen to be at least about twenty five or more to avoid inaccurate results which might otherwise occur due to noise disturbances, recognizing that signal noise in the range of about 5-7% is typical.

When the stored sum in memory reaches a value of substantially zero, the microcontroller 60 operates the motor 36 to reverse to a midpoint location relative to the predetermined number of samples. This reversal is indicated in FIG. 6 by the block 71. That is, if the predetermined number of samples is thirty, the motor is reversed through fifteen incremental steps to a midpoint position corresponding substantially with the peak of the curve 52. As previously described, this peak corresponds with a substantially optimized focus setting position. An alarm 72 (FIG. 4), such as a lamp and/or an audio signal may be activated when the focus setting position is reached to indicate completion of the automatic focus setting procedure. An audio alarm is preferred wherein the alarm is set to sound once when the optimum focus setting position is reached. This alarm 72 can be sounded multiple times to indicate failure to reach an optimum focus setting position as may occur, for example when a blank page is placed onto the platen 20, or when a camera lens cap is not removed from the camera. In this regard, the microcontroller 60 is desirably programmed to reverse the motor 36 a limited number of times before sounding the alarm to indicate nonfocus.

The automatic focus control system of the present invention thus provides a relatively easily operated electronic focus setting system which can be integrated relatively economically into a closed circuit television system for use in magnifying images. The focus control system responds entirely to selected components of the video signal normally provided in such television systems to achieve automated high quality focusing of the image to be viewed.

A variety of modifications and improvements to the focus control system will be apparent to those skilled in the art. Accordingly, no limitation on the invention is intended by way of the foregoing description and accompanying drawings, except as set forth in the appended claims.

What is claimed is:

1. A closed circuit television system, comprising:
   a support frame including a platen for supporting an object to be viewed;
   a video camera on said support frame, said camera having an adjustable focusing lens and including means for generating a video signal representative of an image of the object supported on said platen;
   a video monitor connected to said camera for receiving said video signal and for displaying the image represented by said video signal; and
   automatic focus control means responsive to selected characteristics of said video signal for adjusting said focusing lens to achieve substantially optimum resolution for the image displayed by said monitor, said focus control means including a motor coupled to said focusing lens for adjusting the focus setting of said lens, and a focus control circuit including controller means responsive to said selected characteristics of the video signal for operating said motor to adjust the focus setting of the lens;
   said focus control circuit including means responsive to said video signal for generating a focus signal having a magnitude representative of image focus quality, means for activating said control circuit in a scan mode for operating said motor to adjust said focusing lens rapidly, means for analyzing said focus signal in said scan mode to detect said focus signal in excess of a predetermined threshold, means responsive to the detection of said focus signal in excess of said predetermined threshold to operate said control circuit in a fine adjustment mode for operating said motor to adjust said focusing lens in incremental steps, means for detecting the magnitude of said focus signal for each of said incremental steps and for determining the difference between said detected magnitudes for adjacent incremental steps and for summing and storing the accumulated differences for a predetermined number of incremental steps throughout said fine adjustment mode, said controller means further including means for reversing the position of said lens through one-half of said predetermined number of steps when the accumulated sum substantially equals zero to place said focusing lens in a substantially optimum focus setting position.

2. The system of claim 1 wherein a sight line distance between said focusing lens and said platen is on the order of about one foot or less.

3. The system of claim 1 wherein said monitor is mounted on said support frame.

4. The system of claim 1 wherein the image is displayed on a monitor screen, and wherein said focus control circuit includes means for analyzing portions of the video signal associated with the image displayed generally within a central region of the monitor screen and for disregarding portions of the image displayed outside said central region of the monitor screen.

5. The system of claim 1 wherein said focusing lens has a limited range of focusing setting adjustment, said controller means further including means for altering the position of said focusing lens in a first direction in said scan mode until detection of said focus signal exceeds said predetermined threshold, and for reversing the direction of focusing lens adjustment upon reaching the end of said range of focus setting adjustment without detecting said focus signal exceeding said predetermined threshold.

6. The system of claim 1 further including alarm means activated by said controller means for indicating positioning of said lens in said substantially optimum focus setting position.

7. The system of claim 6 wherein said alarm means is further activated by said controller means for indicating a failure of said lens to reach a substantially optimum focus setting position within a predetermined time period.

8. The system of claim 1 further including means for manually adjusting the focus setting position of said lens.

9. A closed circuit television system, comprising:
   a support frame including a platen for supporting an object to be viewed;
   a video camera on said support frame, said camera having an adjustable focusing lens and including means for generating a video signal representative of an image of the object supported on said platen;
   a video monitor connected to said camera for receiving said video signal and for displaying the image represented by said video signal; and
   automatic focus control means responsive to selected characteristics of said video signal for adjusting said focusing lens to achieve substantially optimum resolution for the image displayed by said monitor;
   said focus control means including a motor for displacing said focusing lens through a range of focus setting positions, and controller means including means responsive to said video signal for generating a focus signal having a magnitude representative of image focus quality, means for activating said control means in a scan mode for operating said motor to adjust said focusing lens rapidly, means for analyzing said focus signal in said scan mode to detect said focus signal in excess of a predetermined threshold, means responsive to the detection of said focus signal in excess of said predetermined threshold to operate said control means in a fine adjustment mode for operating said motor to adjust said focusing lens in incremental steps, means for detecting the magnitude of said focus signal for each of said incremental steps and for determining the difference between said detected magnitudes for adjacent incremental steps and for summing and storing the accumulated differences for a predetermined number of incremental steps throughout said fine adjustment mode, said controller means further including means for reversing the position of said lens through one-half of said predetermined number of steps when the accumulated sum substantially equals zero to place said focusing lens in a substantially optimum focus setting position.

10. The system of claim 9 wherein said focusing lens has a limited range of focusing setting adjustment, said controller means further including means for altering the position of said focusing lens in a first direction in said scan mode until detection of said focus signal exceeding said predetermined threshold, and for reversing the direction of focusing lens adjustment upon reaching the end of said range of focus setting adjustment without detecting said focus signal exceeding said predetermined threshold.

11. In a closed circuit television system having a video camera for producing a video signal representative of an image of a selected object, an adjustable focusing lens on the camera for adjusting image focus, and a video monitor coupled to the video signal for demodulating and displaying the selected image on a monitor screen, a method of automatically focusing the image to a high quality resolution, comprising the steps of:

displacing the focusing lens in a scan mode rapidly in a first direction through a range of focus setting adjustment;

monitoring selected portions of the video signal representative of image focus quality and detecting the presence of said selected video signal portions representative of good focus quality;

displacing the focusing lens in a fine adjustment mode through at least a predetermined minimum number of incremental steps;

detecting differences between said selected video signal portions at adjacent incremental steps and summing and storing the accumulated differences for said predetermined minimum number of incremental steps; and reversing the direction of focusing lens displacement when the accumulated sum substantially equals zero through a number of incremental steps equal to one-half said predetermined minimum number, to place the focusing lens in a focus setting position of high quality resolution.

12. The method of claim 11 wherein said summing and storing steps include disregarding initial detected differences in excess of said predetermined number, when the total number of incremental steps during the fine adjustment mode exceeds said predetermined number.

13. The method of claim 11 wherein said selected video signal portions correspond with images displayed on a central region of the monitor screen, in disregard of images displayed outside the central region of the monitor screen.

* * * * *